United States Patent
Black (10) Patent No.: US 10,793,963 B2
(45) Date of Patent: Oct. 6, 2020

(54) PASSIVATING FISSURES IN SUBSTRATES

(71) Applicant: ILLUMINA, INC., San Diego, CA (US)

(72) Inventor: Hayden Black, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 16/616,867

(22) PCT Filed: Dec. 11, 2018

(86) PCT No.: PCT/US2018/064889
§ 371 (c)(1),
(2) Date: Nov. 25, 2019

(87) PCT Pub. No.: WO2019/125822
PCT Pub. Date: Jun. 27, 2019

(65) Prior Publication Data
US 2020/0102665 A1 Apr. 2, 2020

Related U.S. Application Data

(60) Provisional application No. 62/609,856, filed on Dec. 22, 2017.

(51) Int. Cl.
*C25D 9/02* (2006.01)
*B01L 3/00* (2006.01)
*G01N 27/414* (2006.01)

(52) U.S. Cl.
CPC ............... *C25D 9/02* (2013.01); *B01L 3/502* (2013.01); *G01N 27/4145* (2013.01); *B01L 2300/0645* (2013.01); *B01L 2300/0663* (2013.01); *B01L 2300/0893* (2013.01); *B01L 2300/0896* (2013.01); *B01L 2300/12* (2013.01)

(58) Field of Classification Search
CPC ............... Y01S 438/958; B01L 3/5027; G01N 27/44791
See application file for complete search history.

(56) References Cited

U.S. PATENT DOCUMENTS

| | | | |
|---|---|---|---|
| 4,300,990 A | 11/1981 | Maurer | |
| 6,762,066 B2 | 7/2004 | Holz | |
| 6,797,769 B2* | 9/2004 | Akutsu | C09D 5/4407 524/556 |
| 7,173,683 B2* | 2/2007 | Hur | G02F 1/136286 349/147 |
| 7,948,015 B2* | 5/2011 | Rothberg | C12Q 1/6874 257/253 |
| 8,138,005 B2* | 3/2012 | Jang | G01N 33/5438 313/311 |
| 8,187,865 B2 | 5/2012 | Yun et al. | |
| 8,786,092 B2* | 7/2014 | Okazaki | H01L 23/528 257/260 |

(Continued)

*Primary Examiner* — Luan V Van
*Assistant Examiner* — Caitlyn Mingyun Sun
(74) *Attorney, Agent, or Firm* — Illumina, Inc.

(57) ABSTRACT

Provided in one example is a sensor having at least one fissure, the fissure being at least partially filled by at least one polymer formation extending vertically within a passivation layer. The polymer formation protects the underlying metal containing layer from corrosive solutions. Provided in another example is a method of forming the polymer formation in a fissure of a sensor.

20 Claims, 3 Drawing Sheets (56) References Cited

U.S. PATENT DOCUMENTS

| | | | |
|---|---|---|---|
| 8,906,320 B1* | 12/2014 | Eltoukhy | G01N 21/6486 422/417 |
| 2006/0035068 A1 | 2/2006 | Ochiai et al. | |
| 2007/0048537 A1 | 3/2007 | Knoedler et al. | |
| 2016/0356715 A1 | 12/2016 | Zhong et al. | |
| 2017/0002214 A1* | 1/2017 | Czika | C09D 5/4438 |

* cited by examiner

PASSIVATING FISSURES IN SUBSTRATES

CROSS-REFERENCE TO RELATED APPLICATIONS

This application is a 35 U.S.C. 371 National Stage of International Patent Application No. PCT/US2018/064889, filed Dec. 11, 2018, which itself claims the benefit of and priority to U.S. Provisional Patent Application No. 62/609,856, filed Dec. 22, 2017, the content of each of which is incorporated by reference herein in their entireties and for all purposes.

BACKGROUND

Substrates in flow cell devices are often exposed to corrosive solutions. The substrates act as sensors for flow cell sensors, such as biosensors for DNA and RNA detection or sequencing. Solutions used for these types of sensors are corrosive by nature in order to carry out the tests, such as nucleic acid sequencing. Robust sensors rely on the microscopic integrity of the entire chip, as the corrosive solution can penetrate any cracks or fissures and contact metal containing layers of the chip that are relevant to sensor operation. This can cause a short, partial failure, or complete failure of the sensor in a flow cell device.

Therefore, there is a need for an improved passivation of the surface of sensors that are exposed to flow cell environments.

SUMMARY

The shortcomings of pre-existing approaches may be overcome and additional advantages are provided through the examples provided herein.

In one aspect, a method is provided, the method comprising: passivating at least one fissure in a passivation layer of a sensor, the sensor comprising a metal containing layer, the passivation layer disposed over the metal containing layer, and a structure forming a flow channel above a top active surface of the passivation layer, a top portion of the structure including an electrode, wherein the passivating comprises: applying an aqueous solution comprising a polymer precursor and an electrolyte to the flow channel of the structure; applying a first voltage to the metal containing layer of the sensor; applying a second voltage to the electrode, the second voltage being a voltage of an opposite polarity to the first voltage; and forming a polymer formation extending up from the metal containing layer at the at least one fissure to a top surface of the passivation layer.

In one implementation, the polymer precursor oxidizes electrochemically under the applied voltage, forming a polymer chain growth at the metal containing layer within the fissure. In one implementation, the polymer chain growth deposits within the fissure, forming a coating. In one implementation, the sensor comprises a semiconductor device. In one implementation, the semiconductor device comprises a complementary metal-oxide semiconductor (CMOS) biosensor. In one implementation, the passivating further comprises: removing the first voltage and the second voltage when the polymer formation at least partially fills the at least one fissure. In one implementation, the electrolyte comprises a sulfosuccinate sodium salt. In one implementation, the method further comprises: converting the polymer formation to an electrically insulating polymer formation. In one implementation, the polymer precursor comprises pyrrole, aniline, or a combination thereof.

In accordance with another aspect, an apparatus is provided. The apparatus comprises a sensor having a passivation layer including at least one fissure, the at least one fissure having at least one polymer formation deposited therein and extending vertically within the passivation layer, the sensor comprising: a metal containing layer; the passivation layer deposited over the metal containing layer; and a structure forming a flow channel above a top active surface of the passivation layer.

In one implementation, the sensor further comprises: the at least one polymer formation extending from a top surface of the passivation layer into the metal containing layer and at least partially blocking the metal containing layer. In one implementation, the at least one polymer formation comprises polypyrrole, polyaniline, or a combination thereof. In one implementation, the at least one polymer formation is one of a conductive polymer or an insulating polymer. In one implementation, the sensor further includes: an ancillary electrode disposed on a top surface of the structure. In one implementation, the sensor comprises a semiconductor. In one implementation, the semiconductor comprises a complementary metal-oxide-semiconductor (CMOS) biosensor. In one implementation, a protective layer on the active surface of the sensor comprises a plurality of nanowells.

In accordance with another aspect, an apparatus is provided. The apparatus comprises a complementary metal-oxide semiconductor (CMOS) biosensor comprising: an active metal containing layer; a passivation layer over the active metal containing layer; a plurality of functionalized molecules deposited on the passivation layer; a structure forming a flow cell above a top active surface of the passivation layer; an ancillary electrode disposed on a top surface of the structure; and a polymer formation filling at least one fissure within the passivation layer, the polymer formation being wider at the top active surface of the passivation layer and extending vertically to the metal layer to block a corrosive aqueous solution from penetrating the at least one fissure in the passivation layer.

In one implementation, the fissure comprises a crack in the passivation layer extending to within the active metal containing layer. In one implementation, the crack is between about 5 nanometers and about 10 micrometers wide.

It should be appreciated that all combinations of the foregoing concepts (provided such concepts are not mutually inconsistent) are contemplated as being part of the inventive subject matter disclosed herein. In particular, all combinations of claimed subject matter appearing at the end of this application are contemplated as being part of the inventive subject matter disclosed herein.

BRIEF DESCRIPTION OF THE DRAWINGS

These, and other objects, features and advantages of this application will become apparent from the following detailed description of the various aspects thereof taken in conjunction with the accompanying drawings, in which.

DETAILED DESCRIPTION

Aspects of the present application and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the application, are given by way of illustration only, and are not by way of limitation. Various substitutions, modifications, additions, and/or arrangements, within the spirit and/or scope of the underlying inventive concepts will be apparent to those skilled in the art from this application.

Approximating language, as used herein throughout the specification and claims, may be applied to modify any quantitative representation that could permissibly vary without resulting in a change in the basic function to which it is related. Accordingly, a value modified by a term or terms, such as "about" or "substantially," is not limited to the precise value specified. The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

As used herein, the term "connected," when used to refer to two physical elements, means a direct connection between the two physical elements. The term "coupled," however, can mean a direct connection or a connection through one or more intermediary elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

As used herein, unless otherwise specified, the approximating terms "about," "substantially" and the like, used with a value, such as measurement, size, etc., means a possible variation of plus or minus five percent of the value.

Reference is made below to the drawings, which are not drawn to scale for ease of understanding, wherein the same reference numbers are used throughout different figures to designate the same or similar components.

The present application relates to a sensor with a repaired fissure or fissures and methods of repairing a fissure or fissures. More particularly, the present application relates to at least one polymer formation extending vertically within the passivation layer of a biosensor, and methods of passivating a fissure by forming said polymer formations.

Generally, disclosed herein are methods for repairing devices, which include sensors, for instance biosensors and bioassay systems, which may be configured to perform a plurality of designated reactions that may be detected individually or collectively. The devices, sensors, biosensors, and bioassay systems may be configured to perform numerous cycles in which the plurality of designated reactions occurs in parallel. For example, the devices, biosensors and bioassay systems may be used to sequence a dense array of DNA features through iterative cycles of enzymatic manipulation and light or image detection/acquisition. As such, the devices, sensors, biosensors, and bioassay systems (e.g., via one or more cartridges) may include one or more microfluidic channel that delivers reagents or other reaction components in a reaction solution to a reaction site of the devices, sensors, biosensors, and bioassay systems. In some instances, the reaction sites are provided or spaced apart in a predetermined manner, such as in a uniform or repeating pattern. In some other instances, the reaction sites are randomly distributed. Each of the reaction sites may be associated with one or more light guides and one or more light sensors that detect light from the associated reaction site. In some instances, the reaction sites are located in reaction recesses or chambers, which may at least partially compartmentalize the designated reactions therein.

Figure 1A:
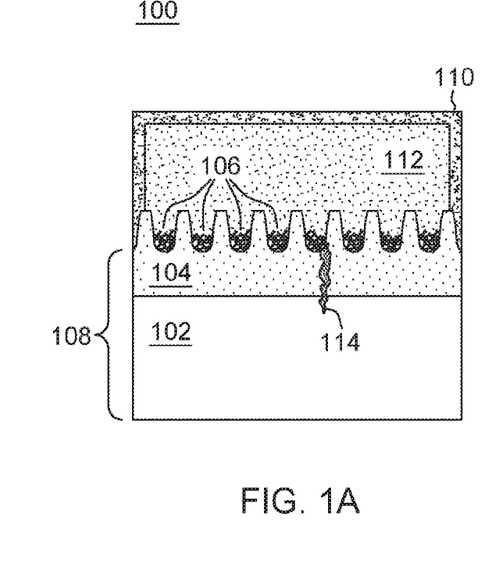
FIG. 1A is a cross section view of a fissure formed in a passivation layer of a sensor.

FIG. 1A is a cross section side view of one example of an existing fissure in a sensor 100. Fissures can be caused in manufacturing and transport of a sensor. Any flexing of the sensor or defects within formed, deposited, or cured layers can result in the formation of a fissure in the sensor, especially at the surface of the sensor. A sensor, in some implementations a biosensor, can include, for instance, a metal containing layer 102 with a passivation layer 104 above. A fissure can include a crack along the surface of the sensor, a hole in a layer, or any other defect within the passivation layer which protects the underlying layers and contains reaction sites. The metal containing layer 102 is illustrated as a single layer, although it should be understood that many layers may be incorporated below the metal containing layer 102, such as a silicon substrate which may include multiple insulating layers and various metal containing layers. The metal containing layer 102 can include, for instance, the gate, wells, and/or transistors of a circuit.

The passivation layer 104 is comprised of an oxide and a nitride. In some implementations, the passivation layer 104 is comprised of silicon dioxide, silicon nitride, a metal oxide, a metal nitride, or a combination thereof. In some aspects, it is within the range of about 5 nanometers to about 100 nanometers. A plurality of functionalized molecules 106 may be on at least a portion of the surface of the passivation layer 104. The functionalized molecules 106, in some aspects, include polymer coatings covalently attached to the surface of the passivation layer 104 above the substrate. The polymer coatings, such as poly(N-(5-azidoacetamidylpentyl)acrylamide-co-acrylamide) (PAZAM), are used in the formation and manipulation of substrates, such as molecular arrays and flow cells. The passivation layer may be coated, in at least one area, by using beads coated with a covalently attached polymer, such as PAZAM, and used in determining a nucleotide sequence of a polynucleotide attached to a substrate surface, in some aspects.

Above the substrate 108, which includes the metal containing layer 102, passivation layer 104, and any further layers which may be included below the metal containing layer 102, is a structure 110 for holding a liquid 112. The structure 110, for instance, includes a flow cell lid or cover, which can include, in some implementations, glass or plastic. The structure 110 holds, during testing for instance, a corrosive aqueous solution which is used for flow cell sensors to hold an analyte for testing. For instance, liquid 112 can include reaction solutions for analysis by the sensor 100. As used herein, a "reaction solution," "reaction component" or "reactant" includes any substance that may be used to obtain at least one designated reaction. For example, potential reaction components include reagents, enzymes, samples, other biomolecules, and buffer solutions, for example. The reaction components may be delivered to a reaction site in a solution and/or immobilized at a reaction site. The reaction components may interact directly or indirectly with another substance, such as an analyte-of-interest immobilized at a reaction site. Thus, the liquid 112 is inherently corrosive.

Figure 1B:
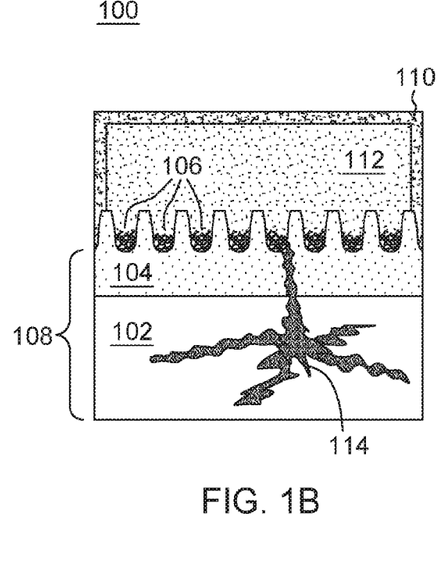
FIG. 1B is a cross section view of a fissure formed in a passivation layer of a sensor and extending into a metal containing layer.

Since liquid 112 is corrosive, if a fissure 114, which can be a crack in the passivating layer 104, extends all the way to the metal containing layer 102, the liquid 112 will corrode and damage the metal containing layer 102, as seen in FIG. 1B. This corrosion results, in some instances, in total sensor death. Thus, there is a need to passivate any fissures that develop during processing, handling, or shipping of substrates, including substrates for sensors.

Figure 2A:
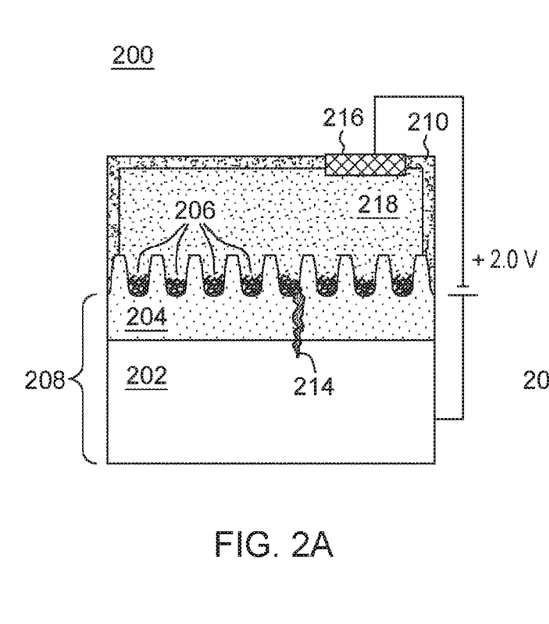
FIG. 2A is a cross section view of a fissure formed in a passivation layer of a sensor, in accordance with one or more aspects of the present application.

Turning to FIG. 2A, a biosensor 200 is illustrated according to some implementations. Biosensor 200 includes a metal containing layer 202. The metal containing layer 202 includes any metal containing layer which functions as a working electrode in a device, such as a flow cell biosensor. The metal containing layer 202, in some implementations, is tungsten or aluminum. Disposed above the metal containing layer 202 is a passivation layer 204, in some implementations directly above the metal containing layer 202. However, further layers may be included between the metal containing layer 202 and the passivation layer 204, including but not limited to insulating layers. The passivation layer 204, in some implementations, includes a plurality reaction sites, being the active surface of the biosensor. Included at the active surface of the biosensor, on the passivation layer 204, is a plurality of functionalized molecules 206.

The plurality of reaction sites may be randomly distributed along the reaction structure or arranged in a predetermined manner (e.g., side-by-side in a matrix, such as in microarrays). A reaction site can also include a reaction chamber or recess that at least partially defines a spatial region or volume configured to compartmentalize the designated reaction. As used herein, the term "reaction chamber" or "reaction recess" includes a defined spatial region of the support structure (which is typically in fluid communication with a flow channel). A reaction recess may be at least partially separated from the surrounding environment or other spatial regions. For example, a plurality of reaction recesses may be separated from each other by shared walls, such as a detector surface. As a more specific example, the reaction recesses may be nanowells formed by an indent, pit, well, groove, cavity or depression defined by interior surfaces of a detection surface and have an opening or aperture (i.e., be open-sided) so that the nanowells can be in fluid communication with a flow channel

The biosensor 200 includes, in some implementations, a semiconductor-based circuit (e.g., an integrated circuit), the individual devices of which may be planar or non-planar (e.g., FinFET-based). In one example, the sensor may be a Complementary Metal-Oxide Semiconductor (CMOS) sensor. In another example, the sensor may be a charge coupled device (CCD). In still another example, the sensor may be electrochemical based.

Based on the type of biosensor and application, the functionalized molecules 206 varies. For instance, the biosensor, in some implementations, includes a sequencing biosensor or a genotyping biosensor, which can analyze RNA, DNA, or a combination thereof from organisms of varying complexities. Additionally, the biosensor can be an electrochemical sensor for detection of, for instance, antibodies, glucose, and other similar applications. Different moieties are used for different types of sensors. The functionalized molecules 206 can include any now known or later developed surface chemistry for biosensor DNA polymerase studies. In some implementations, the functionalized molecules 206, also referred to as the surface chemistry, includes a functionalized hydrogel surface.

Returning to FIG. 2A, any of the features can include those described above in reference to FIGS. 1A and 1B. For instance, the metal containing layer 202 and passivation layer 204, together with any other layers (not illustrated) make up a substrate 208. The substrate 208 can include a semiconductor device, for instance a complementary metal-oxide semiconductor (CMOS) circuit as described above in reference to FIGS. 1A and 1B. The substrate 208, an integrated circuit, operates as a sensor for, in some instances, a flow cell. Such a sensor includes a structure 210 forming a flow channel above the top active surface of the passivation layer 204 containing the functionalized molecules. The structure 210 forms a flow cell using the substrate 208 as the sensor. However, before filling the flow cell with the corrosive aqueous solution 112 for running tests as illustrated in FIGS. 1A and 1B, in a method disclosed herein for passivating a fissure 214, prior to use, in at least the passivation layer 204, extending to or into the metal containing layer 202, the method includes applying an aqueous solution 218 to the flow channel of the structure 210. The aqueous solution 218 includes a polymer precursor suspended in the solution. The precursor includes any polymer monomer, which when polymerized, passivates the fissure 214, including, but not limited to, pyrrole, aniline, and a combination of pyrrole and aniline. In some implementations, the aqueous solution 218 also includes an electrolyte in suspension. The electrolyte includes a sulfosuccinate salt, such as bis(2-ethylhexyl)sulfosuccinate sodium salt.

Figure 2B:
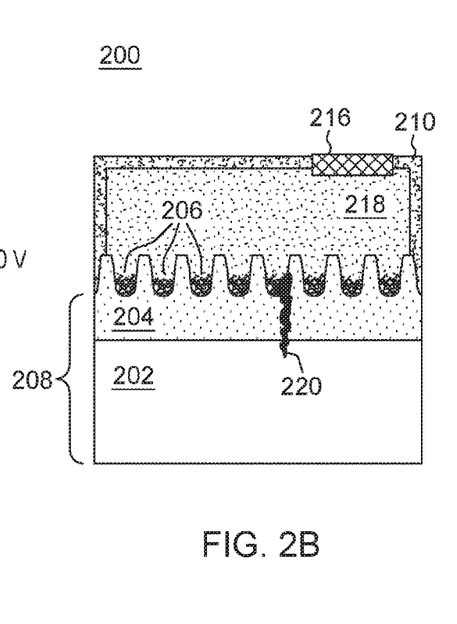
FIG. 2B is a cross section view of a fissure formed in a passivation layer of a sensor and a method of forming a polymer formation in the fissure, in accordance with one or more aspects of the present application.

Attached to the structure 210 is an ancillary electrode, in some implementations the electrode 216 is on a top portion of the structure 210, forming, in operation for the disclosed method, an electrochemical cell between the metal containing layer 202 and the ancillary electrode 216. The method of passivating the fissure 214 includes applying a voltage to both the metal containing layer 202 and the ancillary electrode 216. For instance, applying a positive voltage to the metal containing layer 202 and a negative voltage to the ancillary electrode 216 oxidizes the polymer monomer in the aqueous solution 218 electrochemically. This forms an unstable radical which undergoes a coupling reaction, causing polymer chain growth of the polymer monomer or monomers in solution, but only at the exposed surface of metal containing layer 202. An example electropolymerization is shown for pyrrole below:

As the polymer forms a chain, the chain becomes insoluble and falls out of solution, settling on the exposed metal containing layer 202. Deposition is site-selective, as only exposed portions of the metal containing layer 202 in the at least one fissure 214 will cause the reaction. The insoluble polymer chain that settles on the exposed metal containing layer 202 continues to grow until it is buried by other polymer chains and can no longer react with the aqueous solution 218. The deposition of chains of the polymer passivates the fissure 214 by at least partially filling it with a polymer formation 220, as seen in FIG. 2B. The polymer chains are deposited such that they diffuse through any surface chemistry 206 and at least partially fill any fissure 214 below without interfering with the surface chemistry 206. Additionally, the aqueous solution 218 does not react with the moieties 206 of the surface chemistry, and the electropolymerization is not reactive toward any organic residues found in DNA sequencing surfaces, such as surface chemistry 206, or the reagents used.

The voltage needed to form the polymer formation 220 varies based on the composition of the metal containing layer 202 and the oxidation potential of the monomer of the polymer precursor. For pyrrole monomers, the voltage varies. In some implementations the voltage applied is approximately 1.0V. In some implementations, the voltage applied is approximately 2.0V. In further implementations, the voltage applied is about 2.8V. The voltage surpasses the oxidation potential of the monomer, causing polymerization to occur at the exposed portion of the metal containing layer 202. The polymer will continue to electropolymerize until either the voltage is removed or the aqueous solution 218 is removed. The voltage can be removed when at least one fissure 214 has been at least partially passivated. In some implementations, the voltage is removed when all fissure(s) 214 have been passivated, at least partially, by a user or a controller.

Turning to FIG. 2B, the polymer formation 220 has been formed, extending up from the metal containing layer 202, in some implementations from partially within the metal containing layer 202, to a top surface of the passivation layer 204. This at least partially, if not fully, blocks the metal containing layer 202 from exposure to the corrosive aqueous solution 212 (FIG. 2C) which may be introduced to the sensor 200. For instance, reaction reagents, which are corrosive, may be introduced into and flow through the flow channel formed by structure 210. The polymer formation 220 is formed site-specific, since only the polymer monomers in contact with the metal containing layer 202 within the fissure 214 will react, as voltage is only applied at the fissure 214. The fissure includes any flaws or cracks formed on the substrate 208 during processing, handling, or shipping. The fissure 214 can be between about 5 nanometers (nm) and about 10 micrometers (μm) wide, long, or both. Methods disclosed herein passivate very small nanocracks as well as larger microcracks. The voltage can be applied for about 1 minute to about 15 minutes to passivate some or all cracks or fissure which may exist. The growth of the polymer formation 220 can be observed by eye, with a microscope, and/or by current/voltage characteristics, in order to determine when to remove the voltage from the electrodes.

Figure 2C:
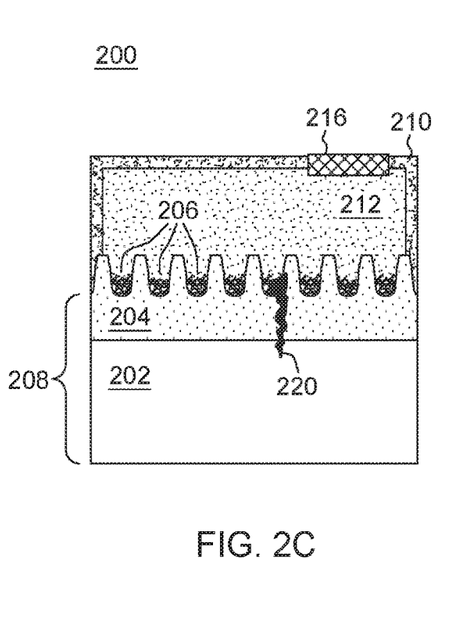
FIG. 2C is a cross section view of a polymer formation formed in a fissure in a passivation layer of a sensor that is filled with an aqueous corrosive solution, in accordance with one or more aspects of the present application.

Turning to FIG. 2C, once the voltage has been removed, the aqueous solution 218 can be removed and replaced with the corrosive aqueous solution 212. Since the polymer formation 220 fills the at least one fissure 214 within the passivation layer 204, the polymer formation 220 is wider at the top active surface of the passivation layer and extends vertically to the metal containing layer 202, blocking the corrosive aqueous solution 212 from penetrating the at least one fissure in the passivation layer and forming a shape that fills a fissure 214, such as a crack in the passivation layer 204.

Figure 3:
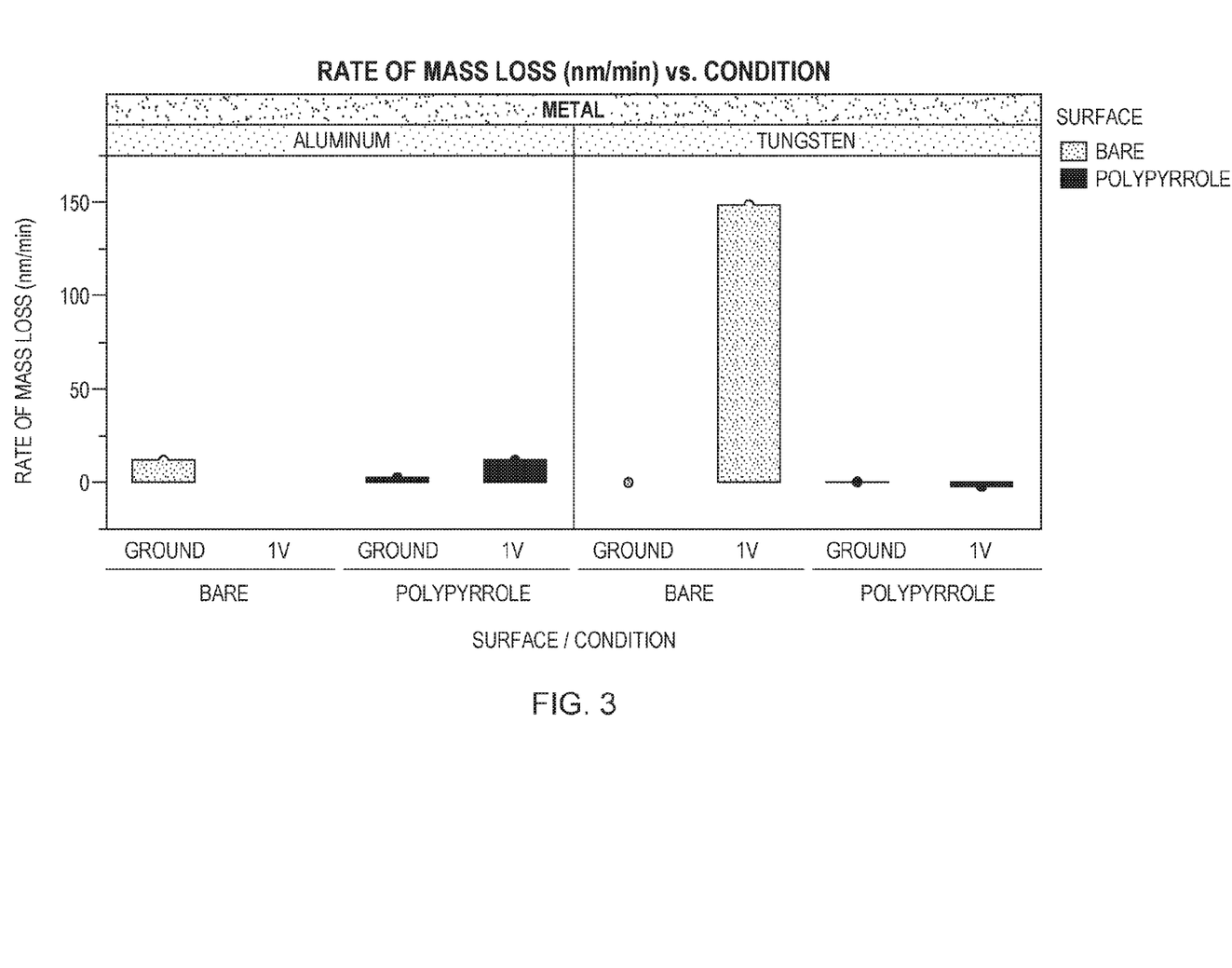
FIG. 3 is a chart showing the passivation of fissures in substrates, in accordance with one or more aspects of the present application.

FIG. 3 illustrates a chart of the rate of mass loss of sensors, showing an etch rate, such as the untreated sensor 100 of FIG. 1A compared to those of passivated biosensors 200 of FIG. 2C. Untreated biosensors and passivated biosensors, according to implementations disclosed herein, were exposed to the corrosive aqueous solution 212 at 55° C. and studied using electrochemical quartz crystal microbalance (QCMB) following being grounded and being exposed to +1V, simulating accelerated corrosion conditions of biosensors, using the metal containing layer 202 as a working electrode and the ancillary electrode 216. The untreated sensor of aluminum on the left of the chart shows that the biosensor was completely destroyed, and thus gave no etch rate as it was destroyed immediately upon exposure to 1V. The stabilized biosensor, which is a sensor 200 which has been treated with a polymer formation according to examples described herein, showed only a marginal increase in etch rate. On the right, the tungsten metal containing layer 202 biosensors showed a high etch rate of 149 nm/min for the untreated biosensor while the stabilized biosensor exhibited an etch rate of nearly 0 nm/min. The etch rate is actually negative, which indicates mass gain. This is attributed to the polymer formation 220 charging and thus, a slight uptake of anion counterions from the solution.

In some implementations, the polymer formation 220 is visible to the eye as a black deposit on the surface of the biosensor 200 when polymerized long enough. To test the effectiveness of the methods disclosed herein, a polymer formation 220 was polymerized for 15 minutes at a defect site for 15 minutes at 2.8V applied to the metal containing layer 202 versus the ancillary electrode 216. The biosensor was then soaked in the aqueous corrosive solution 212 at 55° C. for 50 minutes. There was no observed growth in the size of the original fissure 214.

In implementations described herein, protection is provided in fissures in the passivation layer 204 regardless of the surface chemistry 206, which can include complex and sensitive chemistries, such as, for example, hydrogels used in nucleic acid sequencing. Additionally, the polymer formation 220 is applied only at defect sites, or fissures 214, so as not to interfere with undamaged areas. No heat treatment is necessary in the disclosed methods, unlike previous methods of treating biosensors 200, eliminating a source of complications and damage to the surface chemistry 206 or other areas of the biosensor 200. Additionally, in methods disclosed herein, the aqueous solution 218 and polymer formation 220 do not interfere with the surface chemistry 206 of the biosensor 200, while the deposition of the polymer formation 220 is site specific, and the aqueous solution 208 is non-corrosive. These methods can be utilized at any of the final stages of device formation because of this, and the amount of damage and fissures passivated is increased.

In some implementations, due to the electropolymerization and the polymers used, the polymer formation 220 is electrically conductive, being comprised of conductive polymers, as also illustrated in the negative etch rate of FIG. 3. Conductive polymers which are formed and deposited according to implementations described herein include polypyrrole and polyaniline. These are conductive as deposited due to the backbones of hybridized carbon centers allowing for electrical conductivity due to the loosely bound electrons in delocalized orbitals. The conductive polymer formation 220, in some implementations, is converted to an electrically insulating polymer formation by altering the backbone to reduce the electrical conductivity, in some examples by hydrogenation of the polymer formation 220. Sodium hydroxide can be added to the aqueous solution 218 during or after the formation of the polymer formation 220 to convert the otherwise conductive, but very reactive, polymer to an insulating structure.

In a first aspect, disclosed above is an apparatus. The apparatus includes a sensor having a passivation layer including at least one fissure, the at least one fissure being at least partially filled by at least one polymer formation extending vertically within the passivation layer.

The sensor includes a metal containing layer, a passivation layer, a structure forming a flow channel above a top active surface of the passivation layer, an ancillary electrode disposed on a top surface of the structure, and the at least one polymer formation extends from a top surface of the passivation layer into the metal containing layer.

The at least one polymer formation includes polypyrrole, polyaniline, or a combination thereof, and is electrically conductive or electrically insulating.

The sensor includes a semiconductor device in some implementations. In one example, the sensor described herein may be a biosensor. In a further example, the semiconductor includes a complementary metal-oxide semiconductor (CMOS) biosensor. In some implementations, the biosensor includes an active surface with a protective layer including a plurality of reaction sites, such as nanowells.

In some implementations, the active surface comprises an array of wells or depressions in the surface. This may be fabricated as is generally known in the art using a variety of techniques, including, but not limited to, photolithography, stamping techniques, molding techniques and microetching techniques. As will be appreciated by those in the art, the technique used will depend on the composition and shape of the active surface.

In some implementations, wells or depressions (e.g. microwells or nanowells) on the active surface comprise a covalently-linked gel such as poly(N-(5-azidoacetamidyl-pentyl)acrylamide-co-acrylamide). Covalent linking of the polymer to the wells is helpful for maintaining the gel in the structured features throughout the lifetime of the structured substrate during a variety of uses. However in many implementation, the gel need not be covalently linked to the wells. For example, in some conditions, silane free acrylamide which is not covalently attached to any part of the structured substrate, can be used as the gel material.

In a second aspect, disclosed above is a method. The method includes forming a sensor and passivating at least one fissure in a passivation layer of the sensor. In further implementations, the sensor formed includes a metal containing layer, a passivation layer, and a structure forming a flow channel above a top surface of the passivation layer, a top portion of the structure including an electrode, in some aspects.

The method includes, in some implementations, forming a semiconductor device, which includes forming a complementary metal-oxide semiconductor (CMOS) biosensor in some aspects.

In one aspect, passivating at least one fissure of a sensor includes applying an aqueous solution comprising a polymer precursor to the flow channel of the structure, applying a voltage to the metal containing layer of the biosensor, applying an opposite voltage to the electrode, forming a polymer formation extending up from the metal containing layer at the at least one fissure to a top surface of the passivation layer, and removing the voltages. The aqueous solution includes, in some aspects, an electrolyte and a sulfosuccinate sodium salt.

In one implementation, the method also includes converting the polymer formation to an electrically insulating polymer formation. The polymer precursor includes pyrrole, aniline, or a combination thereof.

In a third aspect, disclosed above is an apparatus. The apparatus includes a complementary metal-oxide semiconductor (CMOS) biosensor, the biosensor including an active metal containing layer, a passivation layer over the active metal containing layer, a plurality of functionalized molecules deposited on the passivation layer, a structure forming a flow channel above a top active surface of the passivation layer, an ancillary electrode disposed on a top surface of the structure, a corrosive aqueous solution within the structure, and a polymer formation at least partially filling at least one fissure within the passivation layer, the polymer formation being wider at the top active surface of the passivation layer and extending vertically to the metal containing layer, blocking the corrosive aqueous solution from penetrating the at least one fissure in the passivation layer.

In some implementations, the fissure includes a crack in the passivation layer extending to within the active metal containing layer and is between about 5 nm and about 10 µm wide.

While several aspects of the present application have been described and depicted herein, alternative aspects may be effected by those skilled in the art to accomplish the same objectives. Accordingly, it is intended by the appended claims to cover all such alternative aspects.

It should be appreciated that all combinations of the foregoing concepts (provided such concepts are not mutually inconsistent) are contemplated as being part of the inventive subject matter disclosed herein. In particular, all combinations of claimed subject matter appearing at the end of this application are contemplated as being part of the inventive subject matter disclosed herein.

The invention claimed is:

1. A method, comprising:
    passivating at least one fissure in a passivation layer of a sensor, the sensor comprising a metal containing layer, the passivation layer disposed over the metal containing layer, and a structure forming a flow channel above a top active surface of the passivation layer, a top portion of the structure including an electrode, wherein the passivating comprises:
        applying an aqueous solution comprising a polymer precursor and an electrolyte to the flow channel of the structure;
        applying a first voltage to the metal containing layer of the sensor;
        applying a second voltage to the electrode, the second voltage being a voltage of an opposite polarity to the first voltage; and
        forming a polymer formation extending up from the metal containing layer at the at least one fissure to a top surface of the passivation layer.

2. The method of claim 1, wherein the polymer precursor oxidizes electrochemically under the applied voltage, forming a polymer chain growth at the metal containing layer within the fissure.

3. The method of claim 2, wherein the polymer chain growth deposits within the fissure, forming a coating.

4. The method of claim 1, wherein the sensor comprises a semiconductor device.

5. The method of claim 4, wherein the semiconductor device comprises a complementary metal-oxide semiconductor (CMOS) biosensor.

6. The method of claim 1, wherein the passivating further comprises:
    removing the first voltage and the second voltage when the polymer formation at least partially fills the at least one fissure.

7. The method of claim 6, wherein the electrolyte comprises a sulfosuccinate sodium salt.

8. The method of claim 6, further comprising:
    converting the polymer formation to an electrically insulating polymer formation.

9. The method of claim 1, wherein the polymer precursor comprises pyrrole, aniline, or a combination thereof.

10. Apparatus, comprising:
    a sensor having a passivation layer including at least one fissure, the at least one fissure having at least one polymer formation deposited therein and extending vertically within the passivation layer, the sensor comprising:
        a metal containing layer;
        the passivation layer deposited over the metal containing layer; and
        a structure forming a flow channel above a top active surface of the passivation layer.

11. The apparatus of claim 10, wherein the sensor further comprises:
    the at least one polymer formation extending from a top surface of the passivation layer into the metal containing layer and at least partially blocking the metal containing layer.

12. The apparatus of claim 10, wherein the at least one polymer formation comprises polypyrrole, polyaniline, or a combination thereof.

13. The apparatus of claim 12, wherein the at least one polymer formation is one of a conductive polymer or an insulating polymer.

14. The apparatus of claim 10, wherein the sensor further includes:
    an ancillary electrode disposed on a top surface of the structure.

15. The apparatus of claim 10, wherein the sensor comprises a semiconductor.

16. The apparatus of claim 15, wherein the semiconductor comprises a complementary metal-oxide-semiconductor (CMOS) biosensor.

17. The apparatus of claim 10, wherein a protective layer on the active surface of the sensor comprises a plurality of nanowells.

18. Apparatus, comprising:
    a complementary metal-oxide semiconductor (CMOS) biosensor comprising:
        an active metal containing layer;
        a passivation layer over the active metal containing layer;
        a plurality of functionalized molecules deposited on the passivation layer;
        a structure forming a flow cell above a top active surface of the passivation layer;
        an ancillary electrode disposed on a top surface of the structure; and
        a polymer formation filling at least one fissure within the passivation layer, the polymer formation being wider at the top active surface of the passivation layer and extending vertically to the metal layer to block a corrosive aqueous solution from penetrating the at least one fissure in the passivation layer.

19. The apparatus of claim 18, wherein the fissure comprises a crack in the passivation layer extending to within the active metal containing layer.

20. The apparatus of claim 19, wherein the crack is between about 5 nanometers and about 10 micrometers wide.

* * * * *